INVENTOR.
CARTER H. SWANN
BY James J. Williams
HIS ATTORNEY

United States Patent Office

3,373,267
Patented Mar. 12, 1968

3,373,267
PROGRAMMING DEVICE
Carter H. Swann, Waynesboro, Va., assignor to General Electric Company, a corporation of New York
Filed May 12, 1964, Ser. No. 366,722
10 Claims. (Cl. 235—92)

ABSTRACT OF THE DISCLOSURE

A programming device for converting the information of a drawing or model to numerical data indicative of this information. An electrical circuit produces the desired indication of position for a predetermined scale drawing or model to be used with the programming device. If the scale of the drawing or model is changed, the electrical circuit can be modified by switches so that the same desired indication of position is produced. Also, an electrical circuit rounds off or modifies the indication of position to any multiple of a unit of distance or measurement.

---

The invention relates to a programming device and particularly to a programming device for converting the information of a drawing or a model to numerical data indicative of this information.

Manufacturing techniques now include scale drawings or scale models which serve as the basis for preparing numerical data. This numerical data is supplied to a numerical positioning control or to a numerical contouring control for controlling a machine that performs some function related to the drawing or model. Such techniques are illustrated by the drilling of component mounting holes at exact positions in a printed circuit board. A scale drawing of the printed circuit board is made, such a drawing usually being several times larger than the actual printed circuit board itself. The drawing is placed on a programming device which has a locator, such as a microscope with cross hairs, that can be moved along perpendicular axes. The programming device has generators which produce signals that indicate the distance along the respective axes between the locator and the programming device origin. The drawing origin and the programming device origin are made coincident, and the locator is then moved, usually by an operator, to each of the hole centers on the drawing. The route followed between hole centers is made as efficient as possible. When the locator is at a hole center, the distance to the origin along both axes is derived from the respective generators. This derived distance may be used in any way desired, such as making a punched paper tape for subsequent use. Such a tape can be used with a numerical positioning control that causes a drill and printed circuit board to move relative to each other and that causes the drill to bore holes in the printed circuit board at the desired locations. Such techniques are also illustrated by the supplying of signals, which represent selected points on a curve, to a computer. The computer calculates data for the curve between the selected points. The calculated data is supplied to a numerical contouring control which produces the curve as motion, for example a tool and workpiece, along the curve.

An object of the invention is to provide an improved programming device.

Known programming devices may utilize generators which are driven by a fixed mechanical arrangement, such as by pinions that mesh with stationary racks. With a fixed mechanical arrangement, such programming devices may be difficult to modify so that different scale drawings can be used with the programming device and so that the generators still produce the proper signals to reflect the different scale.

Accordingly, another object of the invention is to provide a programming device which can be used with different drawing scales without mechanical changes.

Another object of the invention is to provide a programming device which can be used with different scales of drawings by the simple operation of electrical switches.

Some parts are manufactured on the basis of drawings which are not as accurate as the manufactured part is to be. For example, the manufacture of printed circuit boards may be based on drawings which are accurate to at least fifty thousandths of an inch. However, it may be desirable that the component holes be spaced on some multiple of a fixed distance, such as one-tenth of an inch, which is accurate to one-thousandth of an inch.

Accordingly, another object of the invention is to provide a programming device which can accurately round off the position indicated by the generators to any desired multiple of a fixed incremental distance.

Another object of the invention is to provide a programming device which converts the position indicated by the generators to the nearer of any multiple of a fixed distance.

Finally, the programming device operator may move the locator faster than the designed operating ability of the device. In such cases, the indication of the distance from the origin may be inaccurate.

Accordingly, another object of the invention is to provide a programming device that signals when the locator is moved too rapidly along any axis.

The invention is intended to be used with a programming device which indicates the position of a locator along any number of axes relative to an origin. Briefly, the invention provides an electrical circuit which produces the desired indication of position for a predetermined scale drawing or model to be used with the programming device. If the scale of the drawing or model is changed, the electrical circuit can be modified by switches so that the same desired indication of position is produced. The invention further provides an electrical circuit which rounds off or modifies the indication of position to any multiple of a unit of distance or measurement. And finally, the invention provides an electrical circuit that signals when the locator is moved too rapidly for the capabilities of the various circuits in the programming device.

The invention is particularly pointed out in the claims. The invention may be better understood from the following description given in connection with the accompanying drawing, in which:

*Programming device—general description*

Figure 1:
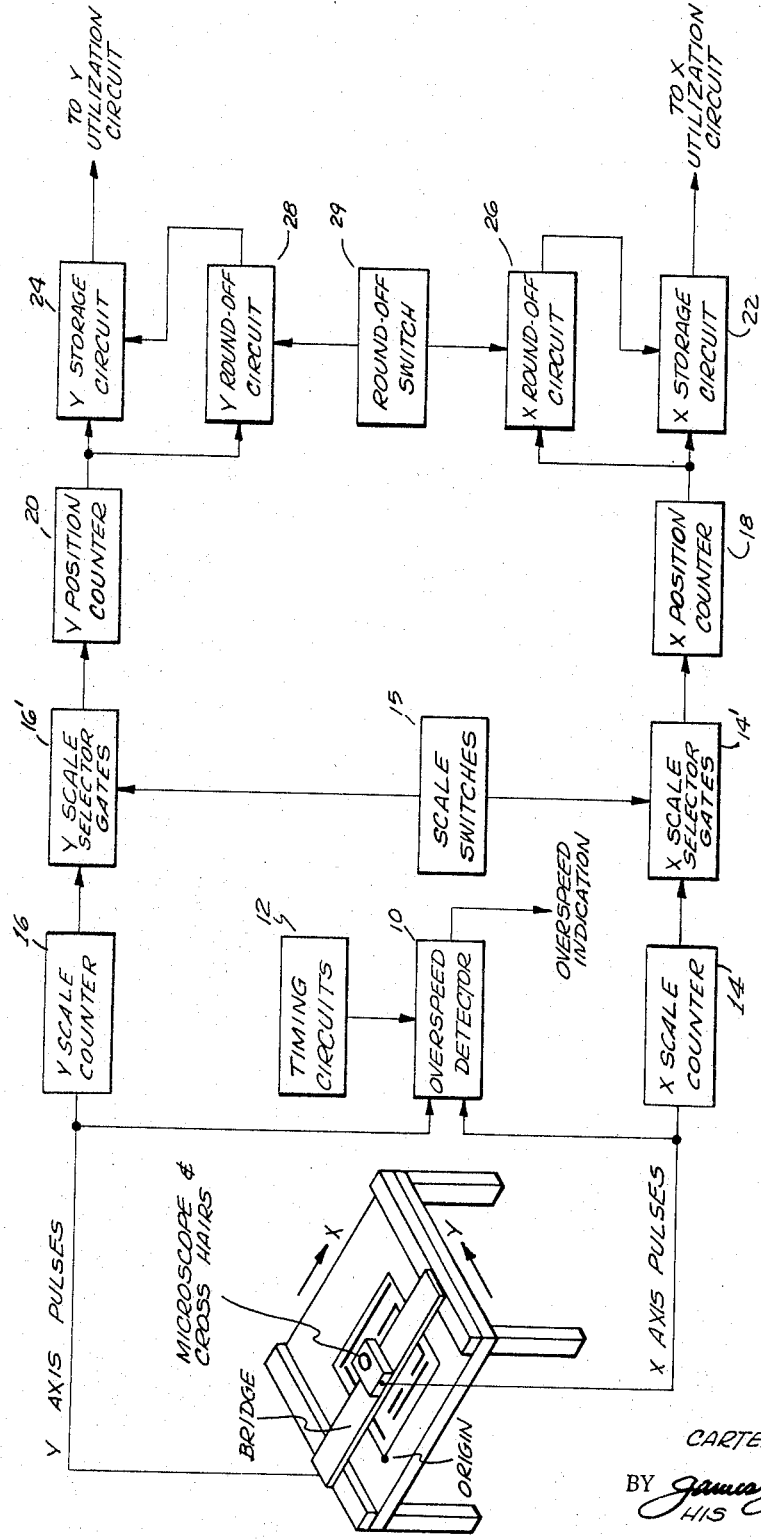
FIGURE 1 shows a block diagram of a programming device in accordance with the invention.

The programming device selected to illustrate the invention operates in two dimensions and uses drawings drawn to scale. However, it is to be understood that a programming device operating in more than or less than two dimensions may also be utilized in accordance with the invention. As shown in FIGURE 1, the programming device comprises a flat table having a bridge which moves along suitable supports in both directions along the arbitrarily designated Y axis. A locator consisting of a microscope and cross hairs is positioned on and moves in both directions along the bridge and along the arbitrarily designated X axis. The X and Y axes are usually perpendicular to each other, but need not be. The microscope and cross hairs are used by an operator to position the locator at any desired point relative to an origin. A generator is associated with the locator, and a generator is associated with the bridge. As the locator is moved along the X and Y axes relative to the origin, a train of electrical signals or pulses is produced by each generator. These electrical signals provide an indication of motion along each axis, and each signal or pulse represents a physical distance traveled. Thus the rate of the signals produced indicates the velocity of the bridge and locator. These signals are produced in a number of known ways, such as a generator positioned on the bridge and rotated by a pinion engaging a rack on a bridge support, and a generator positioned on the locator rotated by a pinion engaging a rack on the bridge. The generator on the bridge produces Y axis signals, and the generator on the locator produces X axis signals. Other position indicating devices such as the optical device shown and described by Cabaniss et al., in Patent No. 3,114,046 granted Dec. 10, 1963, can be used. In FIGURE 1, a drawing shown on the programming device is intended to represent an enlarged printed circuit board drawing. And it is desired to ascertain or get the location of each hole shown on the drawing so that this information can be utilized. As mentioned, one utilization for this information is the preparation of a punched tape which can be used with a numerical positioning control. Such a control can operate a drill press or similar tool and cause the holes to be bored in actual printed circuit boards.

The X axis and Y axis pulses are applied to an overspeed detector 10. In accordance with the invention, this overspeed detector is provided with a timing circuit 12, and produces an overspeed indication if either the X axis pulses or the Y axis pulses occur at a rate which exceeds some predetermined or preset value.

The X axis pulses and Y axis pulses are also respectively applied to X and Y scale counters 14, 16. The outputs of the scale counters are applied to the scale selector gates 14' and 16'. The scale selector gates are controlled by scale switches 15. A programming device such as the one shown is normally designed so that some suitable number of X axis and Y axis pulses are produced for a unit distance traveled along the X and Y axes. For example, one inch of travel along either axis might produce 1,000 pulses associated with that axis. This arrangement would be satisfactory if the scale of the drawing was always the same. However, in some cases it is desirable to use a different scale of drawing. In the case of a printed circuit board, it is frequently desirable to use an oversized or overscaled drawing. For example, a drawing of a printed circuit board might be twice as large as the actual printed circuit board itself. If such a drawing were used, twice the number of pulses would be produced with the result that improper programming would result. In order that this improper programming be corrected, it has previously been necessary to provide a mechanical gear change or a mechanical change of some kind to accommodate the different scale drawings. In accordance with the invention, the X and Y scale counters 14, 16, the scale selector gates 14⁴, 16⁴, and the scale switches 15 operate to change the number of pulses to compensate for the change in the scale of drawing used in a manner to be described shortly in greater detail in connection with FIGURE 2.

After the X axis and Y axis pulses pass through the respective scale counters 14, 16, and gates 14' and 16', they are supplied to X and Y position counters 18, 20. These position counters, 18, 20 are known in the art, and provide a count of the pulses supplied to them. These pulses are then supplied by the respective position counters 18, 20 to X and Y storage circuits 22, 24 where they may be stored for utilization. Generally, while an operator moves the locator from one position on the drawing to another position on the drawing, the first indicated position is derived from the storage circuits 22, 24. While the storage circuits 22, 24 are desirable in that they permit an operator to move the locator to a new position while a previously stored indication is utilized, they are not essential. But they do permit better utilization of the programming device to be achieved. The information may be immediately utilized to actually operate a numerical positioning control or may be utilized to punch a tape or be stored in some more permanent fashion.

In many cases, the drawing or model used is, because of shrinkage or other reasons, less accurate than is needed or desired for the utilization circuit. Thus, the holes of a printed circuit board may be indicated on the drawing to an accuracy of fifty-thousandths of an inch when actually it may be desirable that the holes in the finished printed circuit board be positioned at multiples of one-tenth of an inch to an accuracy of one-thousandth of an inch. In such cases, it is desirable that the indicated position be accurately rounded off or converted to the nearest multiple of one-tenth of an inch. In accordance with the invention, X and Y round-off circuits 26, 28 are provided and are made operative in response to operation of a round-off switch 29. These round-off circuits 26, 28 look at the indications of the numerical significance at which round off is desired and convert or round off these indications before they are utilized.

Scale selector

Figure 2:
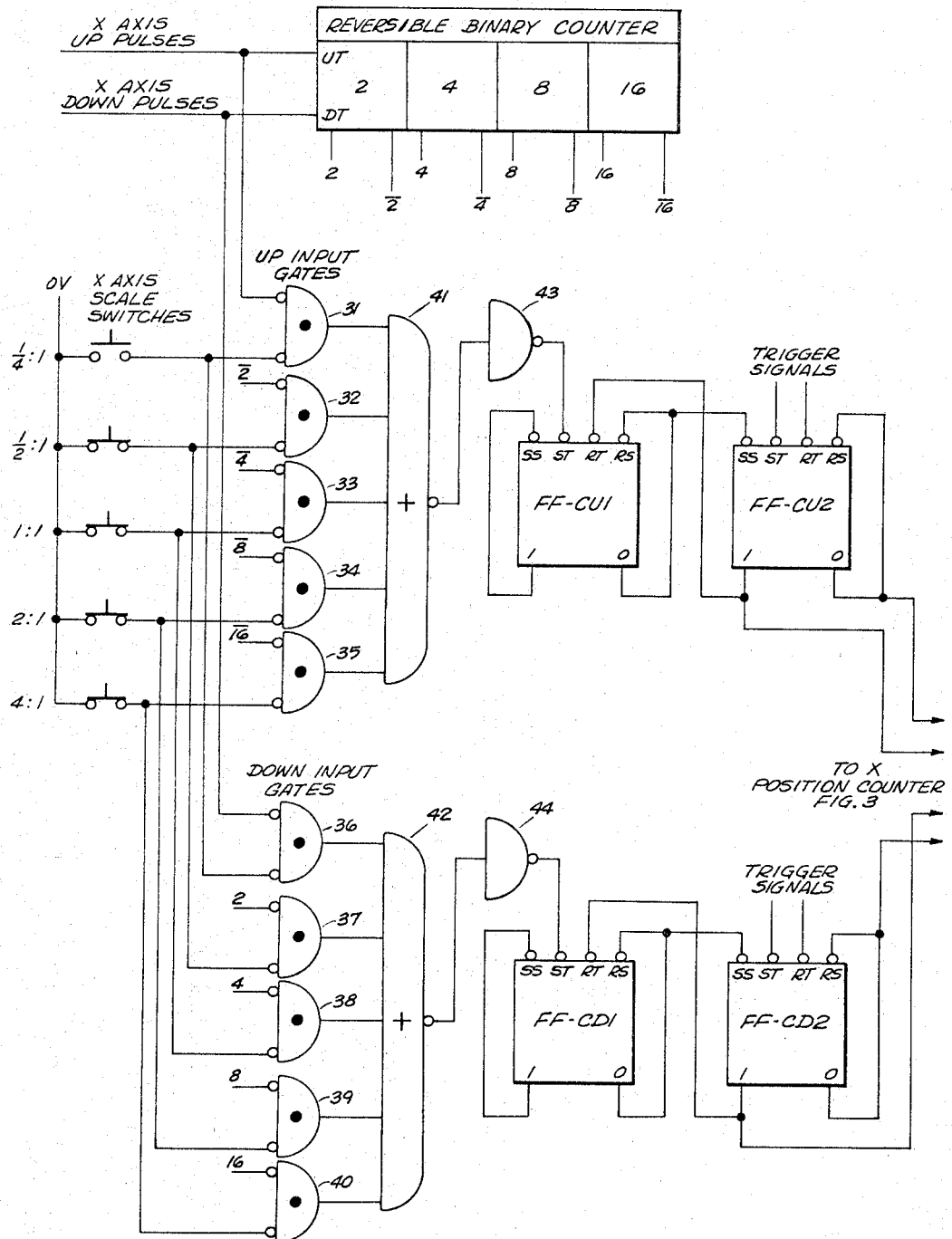
FIGURE 2 shows a more detailed diagram of a scale selector circuit in accordance with the invention.

A more detailed diagram of the X axis scale selector 14 is shown in FIGURE 2. The diagram of the Y axis scale selector 16 is not shown but would be similar. The X axis pulses are actually separated into two trains of pulses which appear on different leads and which respectively indicate X axis motion in arbitrarily designated up and down directions. The same Y axis up and down pulses would also be provided. Patent No. 3,114,046 mentioned previously describes a circuit for producing respective pulses indicative of opposite or up and down directions. In FIGURE 2, it has been assumed that the X scale selector 14 can accommodate the five different scales shown, these being drawing scales of ¼:1, ½:1, 1:1, 2:1, and 4:1. Other scales, of course, can be provided. For purposes of illustration, it has been assumed that 1,000 pulses are needed for each one inch of actual motion in the utilization circuit. Since the smallest scale drawing anticipated is ¼:1, these generators are arranged so that they produce 1,000 pulses for each quarter inch of locator motion. With a ¼:1 scale, one-quarter inch of locator motion is therefore now equivalent to one inch of actual motion in the utilization circuit. However, if a different scale of drawing were used, such as a 1:1, one-quarter inch of locator motion along the 1:1 scale drawing would still produce 1,000 pulses, but this would result in one inch of actual motion in the utilization circuit. Similar errors would result for the other scales larger than ¼:1. For this reason, the invention has provided the scale selectors to electrically correct the number of pulses produced. The X axis up and down pulses are respectively applied to up trigger and down trigger inputs UT, DT of a reversible binary counter having four interconnected flip-flops with the indicated significances. The outputs of these flip-flops are respectively applied to certain ones of input gates 31–40 as indicated. These input gates 31–40 are NOT AND or NOR logic gates which produce a logic 1 output if both inputs are at a logic 0 but produce a logic 0 output if either input is at a logic 1. Used herein, a logic 0 may indicate a positive voltage of approximately plus six volts and a logic 1 may indicate a voltage of zero. There are five up input NOR gates 31–35 and five down input NOR gates 36–40 to provide one up and one down NOR gate for each of the arbitrarily selected scales shown. A different number of scales and gates can be provided. The scale switches are respectively coupled to the other inputs of the up and down input gates 31–40 to selectively apply a logic 1 (zero volt) to the gates. If a switch is not closed, the gate supplies a logic 0 (plus six volts) to its input. The outputs of the five up gates 31–35 are coupled to a five input OR NOT or NOR gate 41, and the outputs of the five down gates 36–40 are coupled to a five input OR NOT or NOR gate 42. The NOR gates 41, 42 likewise produce a logic 0 if any input is at a logic 1, and produce a logic 1 output if all inputs are at a logic 0. The outputs of the NOR gates 41, 42 are respectively coupled through inverters 43, 44, these inverters merely inverting the logic input applied thereto. The inverter 43 is coupled to a count-up flip-flop FF–CU1 which is intercoupled with a count-up flip-flop FF–CU2, and the inverter 44 is likewise coupled to count-down flip-flops FF–CD1 and FF–CD2. The count-up flip-flops are provided to produce two sequential pulses of logic 0 in response to each pulse supplied by the inverter 43. The count-down flip-flops are provided to produce two sequential pulses of logic 0 in response to each pulse supplied by the inverter 44. The sequence of logic 0 pulses is needed so that the position counters 18, 20 function properly. These flip-flops are known in the art and include four inputs, a set steering input SS, a set trigger input ST, a reset trigger input RT, and a reset steering input RS. The outputs of the flip-flops are indicated by terminals 1 and 0. When a flip-flop is set, its terminal 1 is at a logic 1, and its terminal 0 is at a logic 0. When a flip-flop is reset, its terminal 1 is at a logic 0, and its terminal 0 is at a logic 1. These flip-flops are respectively set and reset by the application of a logic 0 to their steering inputs SS, RS followed by the application of a logic 0 applied to their trigger inputs ST, RT. The outputs of the scale selector circuits are derived from the flip-flops FF–CU2 and FF–CD2 and are supplied to the position counter of FIGURE 3.

In FIGURE 2, the scale switches are set for the ¼:1 scale. Under this condition, it is desirable that all pulses be counted. The ¼:1 scale switch being open renders the gates 31, 36 operable since a logic 0 is presented to their lower input terminals. A logic 1 is presented to the lower terminals of the other gates 32–35, 37–40, and these gates are therefore disabled and produce a logic 0 at their outputs. Assume that X axis up pulses are being produced. The gate 31 therefore produces alternate conditions of logic 1 and logic 0 at its output in response to each pulse so that the flip-flops FF–CU1 and FF–CU2 respond to each pulse. The flip-flop FF–CU2 produces the sequence of a logic 0 at its terminal 0 followed by a logic 0 at its terminal 1 in response to each pulse and these logic conditions are supplied to the position counter and are counted. The same X axis up pulses are also supplied to the reversible binary counter so that its flip-flops become set and reset in accordance with the number or quantity of pulses received. Thus, the two flip-flop is set for every second pulse received, the four flip-flop is set for every fourth pulse received, the eight flip-flop is set for every eighth pulse received, and the sixteen flip-flop is set for every sixteenth pulse received. Under these conditions, the gates 32–35, 37–40 are respectively enabled on every second pulse, on every fourth pulse, on every eighth pulse, and on every sixteenth pulse received. These gates may be utilized by opening their respective scale switches. For example, if a scale drawing of 1:1 is to be used, the number of X axis up pulses should be divided by four so that the arbitrarily selected 1,000 pulses per inch of actual motion will be achieved despite the fact that the generator would produce 4,000 pulses in response to each one inch of locator motion.

In other words, the locator motion of one inch on the 1:1 scale drawing represents one inch of actual motion in the utilization circuit. But this locator motion produces 4,000 pulses, which would result in four inches of actual motion in the utilization circuit. Therefore, the pulses must be divided by four. This is achieved by the NOR gates 33, 38 for the up and down directions. If X axis up pulses are being received, the gate 33 produces a logic 1 at its output on every fourth pulse. This causes the flip-flop FF–CU2 to produce its sequence on every fourth pulse received. In this way a division by four is achieved so that the desired actual motion will be achieved. The same explanation would apply for X axis down pulses and for Y axis up and down pulses. The other gates 32–35, 37–40 may be utilized in a similar manner so that an output pulse is produced only for every second, every eighth, or every sixteenth applied input pulse.

It will thus be seen that the scale selectors correct the number of pulses by any desired fraction or ratio. While the ratios of one-half, one-fourth, one-eighth, and one-sixteenth are shown, other ratios may be provided by suitable binary counters which produce the desired signals for any particular number or quantity of pulses applied.

*Position counter*

Figure 3:
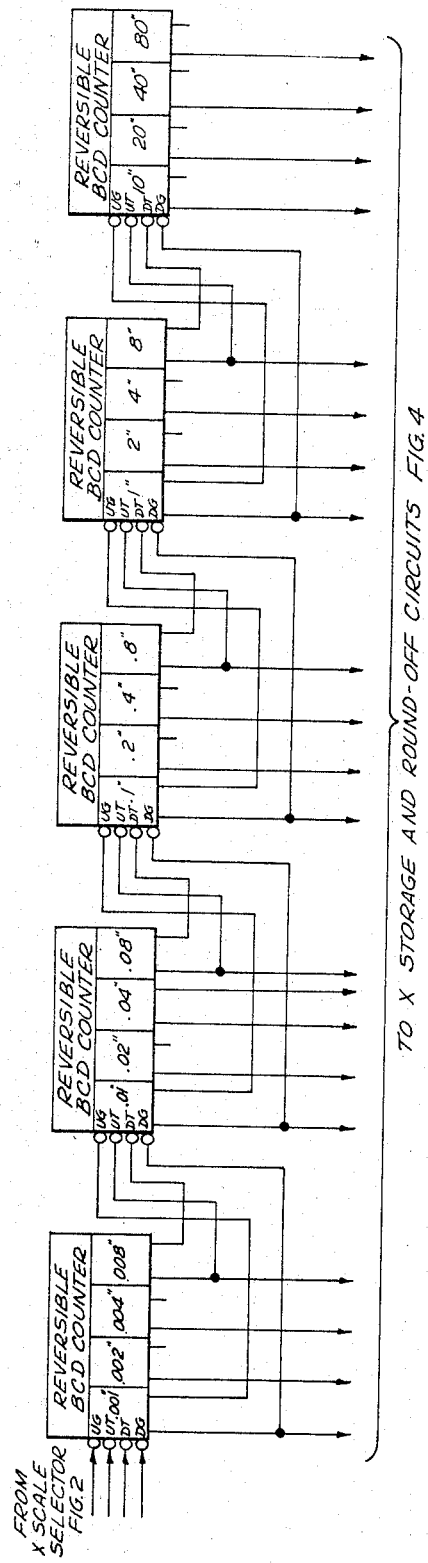
FIGURE 3 shows a more detailed diagram of the position counters of the programming device.

FIGURE 3 shows a more detailed diagram of the X position counter 18. In the illustration shown, it has been assumed that the programming device locator is to move up to 99 inches and that a resolution of one-thousandth of an inch is desired. This capability represents five decades. These five decades of dimensions are counted by five reversible binary coded decimal counters which are shown in FIGURE 3 and which have the indicated dimensional significances. The up and down X axis sequences from FIGURE 2 are coupled to the least significant or one-thousandth inch counter. For each ten counts in the one-thousandth inch counter, one count is supplied to the one-hundredth inch counter. For each ten counts in the one-hundredth inch counter, one count is supplied to the tenth inch counter. For each ten counts in the tenth inch counter, one count is supplied to the unit inch counter. And for each ten counts in the unit inch counter, one count is supplied to the ten inch counter. These counters are known in the art, and include four inputs. Up counts are counted in response to a logic 0 applied to the up gate input UG followed by a logic 0 at the up trigger input UT. Counting in the other direction is achieved by a logic 0 applied to the down gate input DG followed by a logic 0 applied to the down trigger input DT. These counters are known in the art, and have been shown to enable the operation of the invention to be better understood. A similar set of such counters would be provided for the Y position counter 20.

*Round-off circuit*

Figure 4:
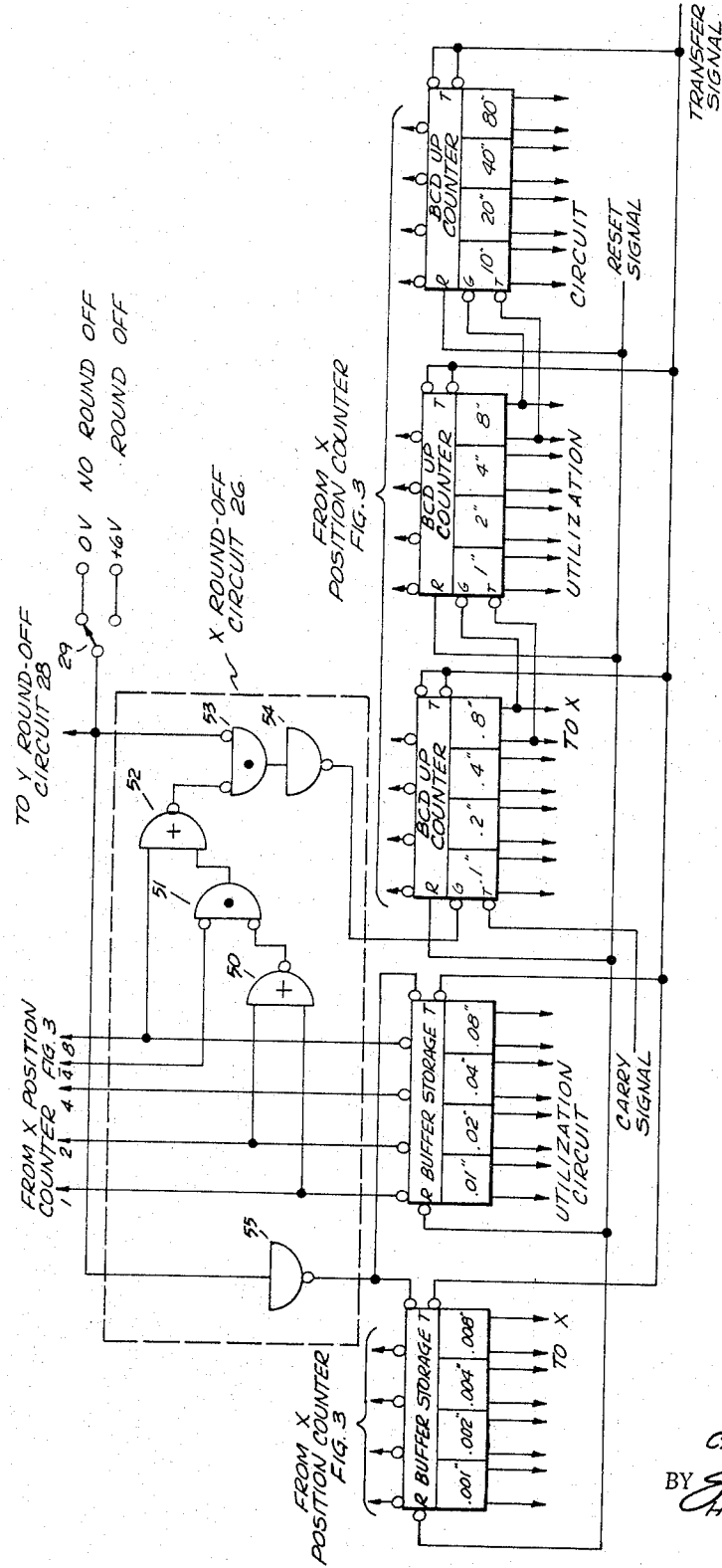
FIGURE 4 shows a more detailed diagram of the round-off circuit in accordance with the invention.

FIGURE 4 shows a more detailed diagram of the X storage circuit 22, its associated round-off circuit 26, and the round-off switch 29. A similar diagram would apply for the Y axis of motion. The X storage circuit 22 comprises five decades, the thousandth inch decade and the hundredth inch decade comprising buffer storages, and the tenth, unit, and ten inch decades comprising binary coded decimal up counters. The thousandth and hundredth inch buffer storages are respectively supplied with inputs from the thousandth and hundredth inch X position counters of FIGURE 3. The buffer storages can be reset to the zero condition by the application of a logic 0 to their reset inputs R. Information supplied to the buffer storages may be transferred into the buffer storages only if both transfer inputs T are at a logic 0. The tenth, unit, and ten inch binary coded up counters are respectively supplied with inputs from the tenth, unit, and ten inch X position counters of FIGURE 3. The binary coded up counters shown in FIGURE 4 are reset by a logic 1 applied to their reset inputs R, and may receive counts if a logic 0 is applied to their gate inputs G followed by a logic 0 supplied to their trigger inputs T. The binary coded decimal up counters may also have information transferred into them if both transfer inputs T are at a logic 0. In the programming device shown, it has been assumed that when round off is desired, this round off is to be to the nearest one-tenth inch. It has also been assumed that if the hundredth inch indication is less than five, then the hundredth and thousandth inch indications are eliminated. However, if the hundredth inch indication is five or greater, then the tenth inch indication is to be increased by one. It is to be understood that other round offs or corrections can be provided, such as in a different decade or such as at a different magnitude in a given decade. Since round off is to be made to the nearest one-tenth of an inch, the round-off circuit 26 is coupled to the hundredth inch decade of the position counter and buffer storage. The round-off circuit includes a two input NOR gate 50 having its inputs coupled to the one and two flip-flops of the hundredth inch position counter. A two input NOR gate 51 has one input coupled to the output of the gate 50 and the other input coupled to the NOT four (i.e., the logic inversion of the four) flip-flop of the hundredth inch position counter. A two input NOR gate 52 has one input coupled to the output of the gate 51 and the other input coupled to the eight flip-flop of the hundredth inch position counter. The output of the gate 52 is coupled to a two input NOR gate 53. The other input of the NOR gate 53 is coupled to the round-off switch 29 and is provided with a logic 0 (actually plus six volts) when the round-off switch 29 is set for the round-off condition. The output of the NOR gate 53 is inverted by an inverter 54 and is supplied to the gate input G of the tenth inch binary coded decimal up counter. The round-off switch 29 is also coupled through an inverter 55 to one of the two transfer inputs T of the thousandth and hundredth inch buffer storages. A reset signal, indicated by the transition from a logic 1 to a logic 0 and back to a logic 1, is provided by a circuit (not shown) for the reset inputs R. A transfer signal, indicated by the transition from a logic 1 to a logic 0 and back to a logic 1, is provided by a circuit (not shown) to both transfer inputs T of the up counters, and to one of the two transfer inputs T of the buffer storage. A carry signal, indicated by the transition from a logic 1 to a logic 0 and back to a logic 1, is provided by a circuit (not shown) to the trigger input T of the tenth inch up counter.

Assume that the round-off switch 29 is set for rounding off, and that the locator position is 77.385 inches. Since round off occurs after the tenth inch indication, and since a hundredth inch dimension of five or greater is to increase the tenth inch indication, this position should be rounded off to 77.400 inches. The reset signal is first supplied to the reset inputs R to reset the buffer storages and the binary coded decimal up counters. Subsequently, the transfer signal is supplied. Since this signal is applied to both transfer inputs T of the three binary coded decimal up counters, these three counters have the information from the X position counters transferred into them. However, the two buffer storages do not have information from the position counters transferred into them because the other transfer inputs T are not supplied with a suitable signal by the inverter 55 in the round-off circuit 26. Since the locator position is eight in the hundredth inch decade, a logic 1 is supplied to the upper input of the NOR gate 52 and this gate produces a logic 0 at its output. This logic 0, along with the logic 0 supplied by the round-off switch 29 causes the gate 53 to produce a logic 1. This logic 1 is inverted to a logic 0 which provides the requisite gate signal at the gate input G of the tenth inch binary coded decimal up counter. Subsequently, a carry signal is provided, and since the requisite gate signal has been supplied, the tenth inch binary coded decimal up counter receives one count and its condition is changed from a three to a four. This provides the indication of 77.4. In the hundredth and thousandth inch buffer storages, the logic 0 applied to the inverter 55 provides a logic 1 at the upper transfer inputs T so that the thousandth and hundredth inch buffer storages can never have the information in their respective position counters transferred. Instead, the thousandth and hundredth inch buffer storages remain in their reset conditions and indicate zero. Thus, the round-off circuit 26 provides the rounded off indication of 77.400. The logic gates 50, 51, 52 in the round-off circuit 26 are coupled to the flip-flops of the hundredth inch position counter of FIGURE 3 so that a count of one, or two, or one and two, or four would not produce the needed logic 0 at the output of the inverter 54. However, a count of four and one, or four and two, or four and one and two, or eight, or eight and one, would produce the requisite logic 0 at the output of the inverter 54 to produce the additional count up in the tenth inch up counter.

If round off is not desired, the round-off switch 29 is set for the no round-off condition. This supplies a logic 1 (actually zero volt) to the gate 53 which produces a logic 0. This logic is inverted to a logic 1 by the inverter 54 and supplied to the gate input G of the tenth inch binary coded decimal up counter. This logic 1 prevents the tenth inch binary coded decimal up counter from receiving a carry signal. The logic 1 from the round-off switch 29 is also inverted to a logic 0 by the inverter 55, and this logic 0 and the logic 0 of the transfer signal are applied to the transfer inputs T of the buffer storages and permit the buffer storages to have the information in their respective position counters transferred. Thus all information in the storage circuits 22, 24 can be utilized by the utilization circuits until it is cleared.

*Overspeed detector*

Figure 5:
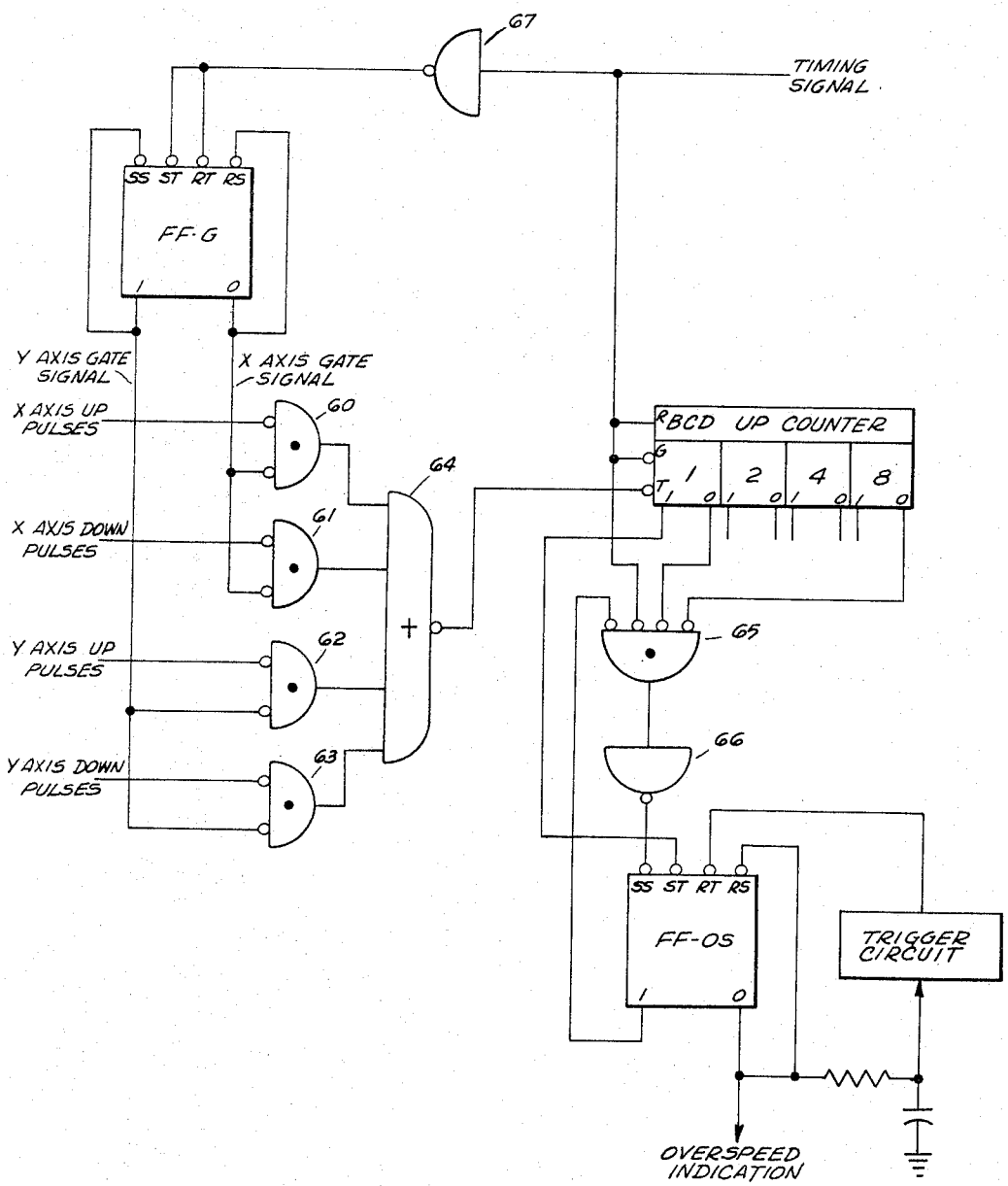
FIGURE 5 shows a more detailed diagram of the overspeed detector in accordance with the invention.
Figure 6:
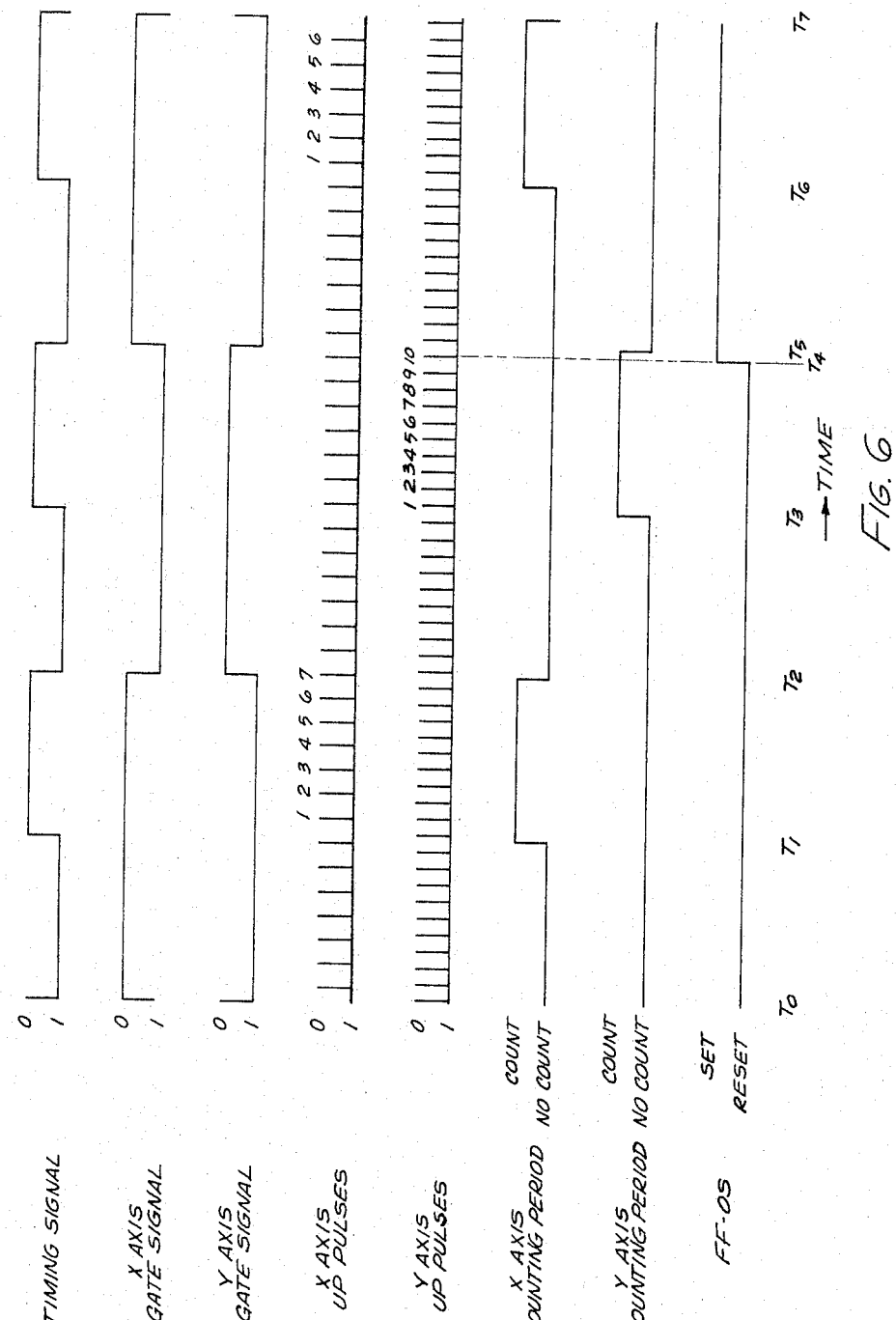
FIGURE 6 shows waveforms for explaining the operation of the overspeed detector of the invention.

It is possible for an operator to move the bridge and the locator quite rapidly. For example, a quick push might produce a velocity of 1,000 inches per minute. For some generators associated with the programming device, pulses would be produced too rapidly for the electrical circuits to receive and utilize these pulses. Therefore, it is desirable that overspeeds of the bridge or locator be indicated so that the operator can check to see if an error has resulted. FIGURE 5 shows a more detailed diagram of the overspeed detector 10, and FIGURE 6 shows waveforms for explaining the operation of the overspeed detector 10. The X and Y axes up and down pulses are respectively applied to NOR gates 60, 61, 62, 63. The X axis gates 60, 61 are also coupled to the terminal 0 of a gating flip-flop FF–G and the Y axis gates 62, 63 are coupled to the terminal 1 of the gating flip-flop FF–G. The outputs of the gates 60, 61, 62, 63 are coupled to a four input NOR gate 64, the output of this gate 64 being coupled to the trigger input T of a binary coded decimal up counter. The gating flip-flop FF–G has its output terminals 1 and 0 respectively coupled to its steering terminals SS and RS. The trigger terminals of the flip-flop FF–G are coupled through an inverter 67 to a timing signal, which is supplied by the timing circuit 12 of FIGURE 1. This timing signal is also used to reset and gate the binary coded decimal up counter, and to supply one input to a four input NOR gate 65. Two inputs of the gate 65 are coupled to the NOT one and NOT eight flip-flops of the up counter. The output of the gate 65 is inverted by an inverter 66 and supplied to the set steering terminal SS of an overspeed flip-flop FF–OS. The terminal 1 of the over speed flip-flop FF–OS is coupled to the gate 65. The terminal 0 of the flip-flop FF–OS provides an overspeed indication, and also provides itself with reset steering directly, and with a reset trigger through a time delay circuit comprising a resistor and a capacitor, and a trigger circuit.

The operation of the overspeed detector circuit of FIGURE 5 will be explained in connection with the waveforms shown in FIGURE 6. In FIGURE 6, the waveforms are plotted against a common time axis. The timing signal may be derived from any suitable source and is arranged to vary between a logic 0 and a logic 1 at a rate dependent upon the acceptable pulse rate. In other words, for a given timing signal interval, the number of pulses should not exceed a predetermined quantity. In FIGURE 6, it has been assumed that the operator is moving the bridge and locator in the up direction along both the X and Y axes, and that the speed of the locator is within acceptable limits along the X axis but that the speed of the bridge is too fast along the Y axis. At the time $T_0$, the timing signal changes from a logic 0 to a logic 1. This logic is inverted and causes the gating flip-flop FF–G to become set. The terminal 0 of the gating flip-flop FF–G is at logic 0 and permits X axis pulses to be supplied through the gate 60 to the gate 64. This is indicated by the X axis gate signal switching from a logic 1 to a logic 0. The terminal 1 of the gating flip-flop FF–G is at logic 1 and blocks the gate 62. This is indicated by by the Y axis gate signal switching from a logic 0 to a logic 1. This same timing signal resets the up counter by supplying a logic 1 to its reset input R. At the time $T_1$, the timing signal switches from a logic 1 to a logic 0. This has no effect on the gating flip-flop FF–G, but provides a gating signal to the gating input G of the up counter and permits counting pulses to be counted. This is indicated by the X axis counting period changing from a no count condition to a count condition. During this counting period, seven X axis up pulses are received. Since the eight flip-flop of the up counter is still reset, a logic 1 is supplied to the gate 65 and this produces a logic 0 at the output of gate 65. This logic 0 is inverted to a logic 1 so that the overspeed flip-flop FF–OS does not receive set steering, and remains reset. At the time $T_2$, the timing signal switches from a logic 0 to a logic 1 to reset the up counter and to reset the gating flip-flop FF–G. This is indicated by the X axis gate signal returning to a logic 1, by the Y axis gate signal switching to a logic 0, and by the X axis counting period returning to a no count condition.

Nothing occurs until the time $T_3$ when the timing signal switches to a logic 0 to supply a gate signal to the up counter. The Y axis up pulses are passed by the gate 62 and applied to the up counter. This is indicated by the Y axis counting period changing from a no count condition to a count condition. When the ninth pulse is received during the Y axis counting period, the one and eight flip-flops of the up counter respectively supply logic 0 to the gate 65. The timing signal still supplies a logic 0 to the gate 65. The overspeed flip-flop FF–OS being reset also supplies a logic 0 to the gate 65. The gate 65 produces a logic 1 which is inverted to a logic 0, thus providing set steering for the overspeed flip-flop FF–OS. If, under these conditions, a tenth pulse is received, the one flip-flop of the binary coded decimal up counter again becomes reset, and its terminal 1 provides a logic 0 to the set trigger input ST of the overspeed flip-flop FF–OS. The overspeed flip-flop FF–OS becomes set at the time $T_4$ as indicated. When the overspeed flip-flop FF–OS becomes set, its terminal 0 becomes a logic 0 which can be used to provide any desired overspeed indication such as the picking up of a relay, the turning on of a light, or the sounding of an alarm. This same logic 0 also provides reset steering for the overspeed flip-flop FF–OS. The logic 0 also provides a reset trigger after a suitable time delay. When the logic 0 is applied to the time delay circuit, the capacitor begins to charge. When the capacitor reaches a predetermined charge, it causes the trigger circuit to produce a pulse of logic 0 which resets the overspeed flip-flop FF–OS. Thus, the overspeed flip-flop FF–OS resets itself after a suitable time. This suitable time can be adjusted so that if another ten pulses are counted during an appropriate counting period, the flip-flop FF–OS will again become set before this time delay has expired. Thus, the overspeed indication can be maintained. It will be appreciated that any suitable timing constants can be utilized and that the overspeed flip-flop FF–OS may be provided wtih a circuit which requires an operator for resetting rather than an automatic time delay circuit.

The invention thus provides an improved programming device. While the invention has been shown with a programming device for a two-dimensional drawing, the invention can be utilized with other programming devices as well. For example, the invention can be used with a single axis programming device, or with a three-dimensional programming device such as with a three-dimensional model. And, the invention can be used with any one or all of such axes. Or, part of the invention may be used with one axis, and part of the invention used with another axis, or any parts of the invention used with any or all of the axes. Therefore, while the invention has been described with reference to a particular embodiment, it is to be understood that modifications may be made without departing from the spirit of the invention or from the scope of the claims.

What I claim as new and desire to secure by Letters Patent of the United States is:

1. In a programming device having a locator capable of being moved along at least one dimension, and having a generator for producing signals in response to motion along said dimension, the improvement comprising a counting device adapted to be coupled to said generator for counting and indicating predetermined quantities of said generator signals; a plurality of gating means, means for producing output signals corresponding to dividing said generator signals by a number greater than one comprising means coupling said gating means to said counting device whereby said gating means produces said output signals, and means for changing said number comprising means for adjusting the coupling of said gating means to said counting device.

2. In a programming device having a locator capable of being moved along at least one dimension, and having a generator for producing pulses indicative of motion along said dimension, said pulses occurring with a predetermined relation to the distance traveled along said dimension, the improvement comprising means adapted to be coupled to said generator for indicating the occurrence of predetermined quantities of said pulses; a plurality of selectively operable gating means; means for producing an output signal corresponding to dividing the generator pulses by a whole number greater than one comprising means respectively coupling said plurality of gating means to said indicating means so that any selectively operated gating means produces an output signal in response to each respective indicated quantity of said pulses and means for changing said whole number comprising means for adjusting the selectivity of said gates to change the point of coupling of said plurality of gating means to said indicating means.

3. In a programming device having a locator capable of being moved along at least one axis, and having a generator for producing motion signals in response to locator motion along said axis, said motion signals occurring at a rate indicative of the distance traveled along said axis, the improvement comprising a counter having an input adapted to be coupled to said generator for counting said motion signals and having a plurality of outputs for indicating respective quantities of counted motion signals; means for producing an output signal corresponding to dividing the generator motion signals by a whole number greater than one comprising a plurality of selectively operable gates each having an input and an output; means respectively coupling said gate inputs to said counter outputs for causing each selectively operated gate to produce an output signal in response to each occurrence of an indicated quantity of said counted motion signals, and means for changing said whole number comprising means for changing the point of coupling of said gate inputs to said counter outputs.

4. In a programming device having a locator capable of being moved along at least one axis, and having a generator for producing motion signals in response to locator motion along said axis, said motion signals occurring at a rate indicative of the distance traveled along said axis, the improvement comprising a counter having an input adapted to be coupled to said generator for counting said motion signals and having at least one output for indicating respective quantities of counted motion signals; a plurality of selectively operable gates each having an input and an output; and means for coupling each of said gate inputs to a respective one of said counter outputs or to said generator for causing each selectively operated gate to produce output signals corresponding to dividing the generator motion signals by one or by a whole number greater than one respectively, and means for changing said whole number comprising means for adjusting the selectivity of said gates to change the respective one of said counter outputs coupled to each of said gate inputs.

5. In a programming device having a locator capable of being moved along at least two axes, and having first and second generators for producing respective motion signals in response to locator motion along said two axes, said motion signals occurring at a rate indicative of the distance traveled along said axes, the improvement comprising a first counter having an input adapted to be coupled to said first generator for counting said motion signals and having a plurality of outputs for indicating respective quantities of counted motion signals; a second counter having an input adapted to be coupled to said second generator for counting said motion signals and having a plurality of outputs for indicating respective quantities of counted motion signals; a plurality of selectively operable first gates each having an input and an output; a plurality of selectively operable second gates each having an input and an output; means respectively coupling said inputs of said plurality of first gates to said first counter outputs for causing each selectively operated first gate to produce an output signal in response to each occurrence of an indicated quantity of said counted motion signals; and means respectively coupling said inputs of said plurality of second gates to said second counter outputs for causing each selectively operated second gate to produce an output signal in response to each occurrence of an indicated quantity of said counted motion signals.

6. In a programming device having a locator capable of being moved along at least one axis, and having a generator for producing signals in response to motion along said dimension, the improvement comprising a counter adapted to be coupled to said generator for counting said generator signals, said counter comprising a plurality of elements having related decade significance; a round-off circuit; means coupling said round-off circuit to predetermined ones of said counter elements for preventing said predetermined elements from indicating any count therein in response to a round-off signal; and means coupling said round-off circuit to said predetermined counter elements and to the next more significant counter element for adding a count to said more significant counter element in response to a round-off signal and in response to said predetermined counter elements having a count that exceeds a predetermined magnitude.

7. In a programming devise having a locator capable of being moved along at least one dimension, and having a generator for producing pulses indicative of motion along said dimension, said pulses occurring with a predetermined relation to the distance traveled along said dimension, the improvement comprising a counter adapted to be coupled to said generator for receiving said pulses, said counter comprising a plurality of stages having intercoupled numerical significance; a round-off circuit; means coupling said round-off circuit to at least one predetermined stage for preventing said predetermined stage from indicating any of said pulses therein in response to a round-off signal; and means coupling said round-off circuit to said predetermined stage and to the next more numerically significant stage for adding a count to said next more significant stage in response to round-off signal and in response to said predetermined stage having an indication that exceeds a predetermined quantity.

8. In a programming devise having a locator capable of being moved along at least one axis, and having a generator for producing motion signals in response to motion along said axis, said motion signals occurring at a rate indicative of the distance traveled along said axis, the improvement comprising a counter adapted to be coupled to said generator for counting said motion signals, said counter comprising a plurality of intercoupled stages having different numerical significances; a round-off circuit; means coupling said round-off circuit to predetermined and less significant stages of said counter for blocking any indication in said predetermined stages in response to a round-off signal; means coupling said round-off circuit to said predetermined stages and to the next more significant stage of said counter for increasing the indication in said next more significant stage by one unit of said next more significant stage in response to a round-off signal and in response to said predetermined stages having an indication that exceeds a predetermined magnitude; and means coupled to said round-off circuit for supplying a round-off signal thereto.

9. In a programming device having a locator capable of being moved along at least one axis, and having a generator for producing motion signals in response to motion along said axis, said motion signals occurring at a rate having a predetermined relation to the speed at which said locator is moved along said axis, the improvement comprising means for producing a timing signal having a predetermined time duration; counting means coupled to said timing means for counting signals applied to said counting means in response to said timing signal and for producing an indication in response to the number of said counted signals exceeding a predetermined number during said predetermined time duration; and means coupled to said counting means and adapted to be coupled to said generator for supplying said motion signals to said counting means.

10. In a programming device having a locator capable of being moved along at least one axis, and having a generator for producing motion pulses at a rate indicative of the speed of travel of said locator along said axis, the improvement comprising means for producing a timing signal having a predetermined time duration; counting means coupled to said timing means and rendered operative by said timing signal for counting pulses applied to said counting means and producing an indication in response to a predetermined number of pulses counted during said predetermined time duration; and means coupled to said counting means and adapted to be coupled to said generator for selectively applying said pulses to said counting means.

References Cited
UNITED STATES PATENTS

| | | | |
|---|---|---|---|
| 3,172,598 | 3/1965 | Carson | 235—92 |
| 3,251,039 | 5/1966 | Dupy | 235—92 |
| 3,260,839 | 7/1966 | Brown | 235—92 |
| 3,298,015 | 1/1967 | Herman | 340—347 |

MAYNARD R. WILBUR, *Primary Examiner.*

G. J. MAIER, *Assistant Examiner.*